US012704594B2

(12) United States Patent
Yoo et al.

(10) Patent No.: US 12,704,594 B2
(45) Date of Patent: Aug. 11, 2026

(54) METHOD AND DEVICE FOR PERFORMING WIRELESS SENSING BASED ON WIRELESS SENSING

(71) Applicant: LG ELECTRONICS INC., Seoul (KR)

(72) Inventors: Homin Yoo, Seoul (KR); Hangyu Cho, Seoul (KR); Hongwon Lee, Seoul (KR); Jeonghwan Yoon, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 509 days.

(21) Appl. No.: 18/270,711

(22) PCT Filed: Jan. 5, 2021

(86) PCT No.: PCT/KR2021/000043
§ 371 (c)(1),
(2) Date: Jun. 30, 2023

(87) PCT Pub. No.: WO2022/149622
PCT Pub. Date: Jul. 14, 2022

(65) Prior Publication Data

US 2024/0077584 A1 Mar. 7, 2024

(51) Int. Cl.

| | |
|---|---|
| ***G01S 7/00*** | (2006.01) |
| ***G01S 7/41*** | (2006.01) |
| *H04W 4/38* | (2018.01) |
| *H04W 84/12* | (2009.01) |

(52) U.S. Cl.
CPC .............. *G01S 7/415* (2013.01); *G01S 7/006* (2013.01); *H04W 4/38* (2018.02); *H04W 84/12* (2013.01)

(58) Field of Classification Search
CPC ........ G01S 7/415; G01S 7/006; G01S 13/003; H04W 4/38; H04W 84/12; H04L 12/28
See application file for complete search history.

(56) References Cited

U.S. PATENT DOCUMENTS

| | | | |
|---|---|---|---|
| 2018/0077518 A1 | 3/2018 | Nguyen et al. | |
| 2019/0075424 A1 | 3/2019 | Zakaria | |
| 2019/0213857 A1 | 7/2019 | Ghourchian et al. | |
| 2019/0349715 A1* | 11/2019 | Ghourchian ............ | H04W 4/33 |
| 2020/0328793 A1* | 10/2020 | Martinez ............... | H04L 1/0026 |

FOREIGN PATENT DOCUMENTS

| | | |
|---|---|---|
| KR | 20150107005 | 9/2015 |

* cited by examiner

*Primary Examiner* — William Kelleher
*Assistant Examiner* — Juliana Cross
(74) *Attorney, Agent, or Firm* — BRYAN CAVE LEIGHTON PAISNER LLP

(57) ABSTRACT

Proposed are a method and device for performing wireless sensing in a wireless LAN system based on wireless sensing. Specifically, a wireless apparatus collects CSI data and lifelog. The wireless apparatus performs learning and prediction on the basis of the CSI data to acquire a first user estimation result. When the first user estimation result is at most a threshold value, the wireless apparatus predicts a second user estimation result on the basis of the lifelog.

10 Claims, 20 Drawing Sheets

FIG. 1
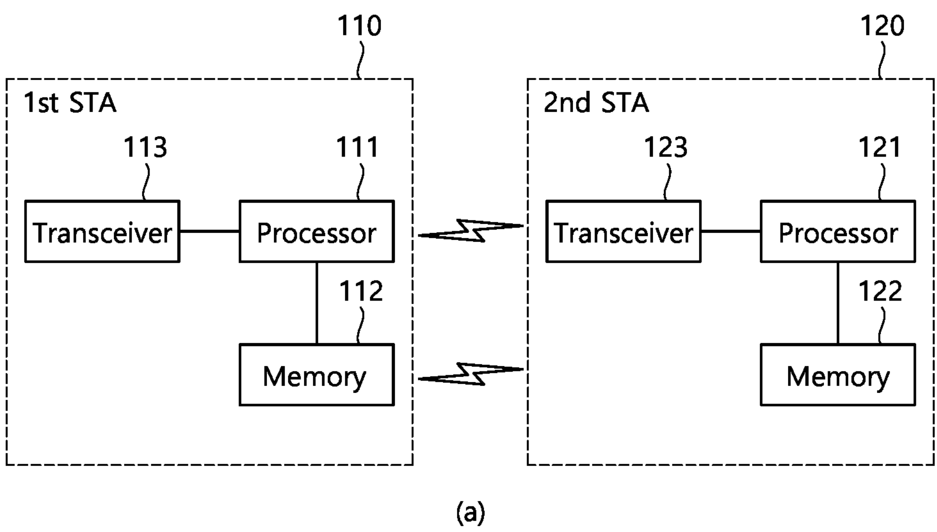
(a)
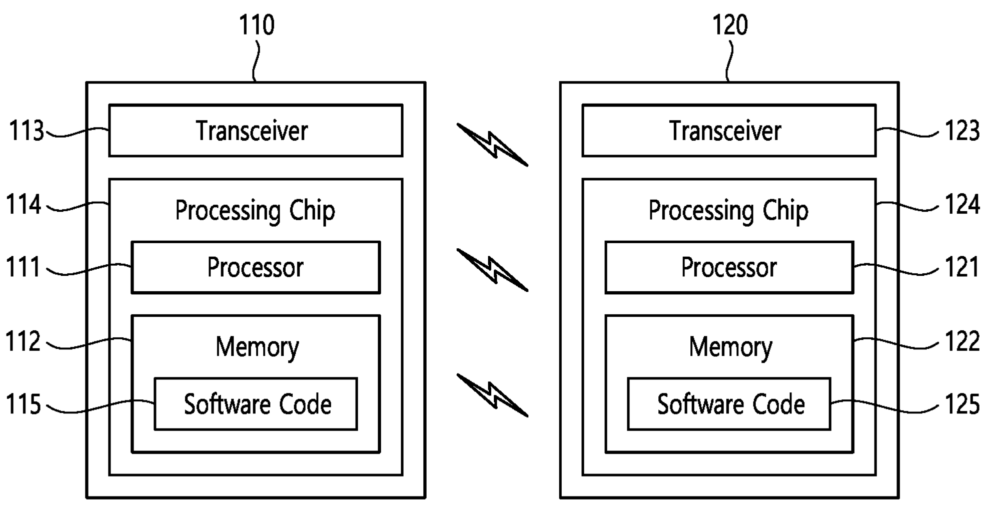
(b)

FIG. 2
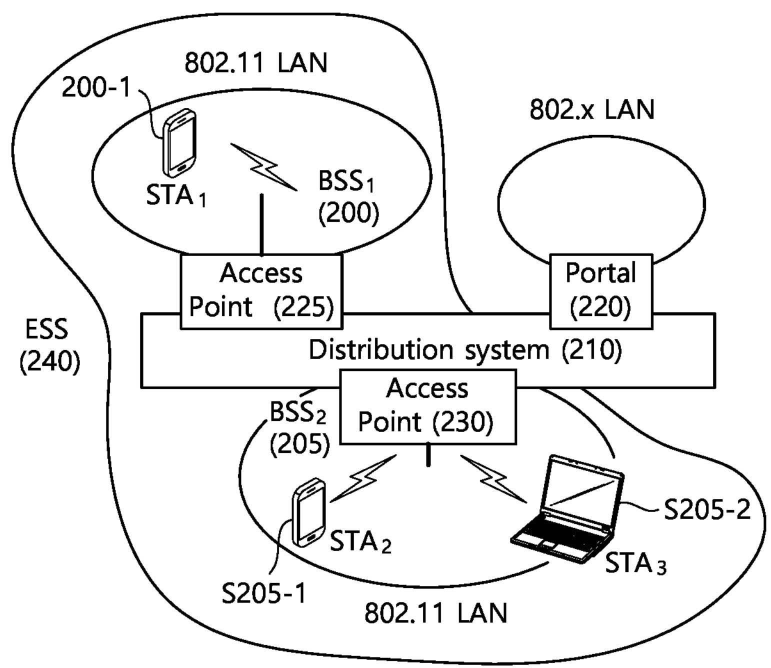
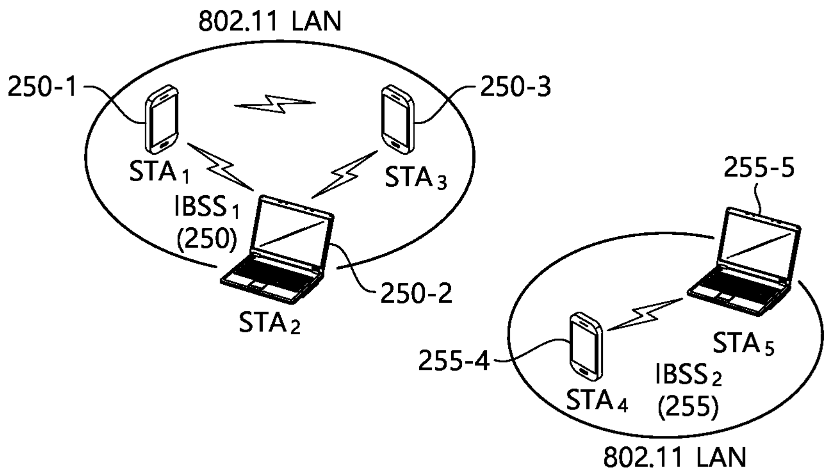

CSI amplitude in the same location (B)

Figure 8:
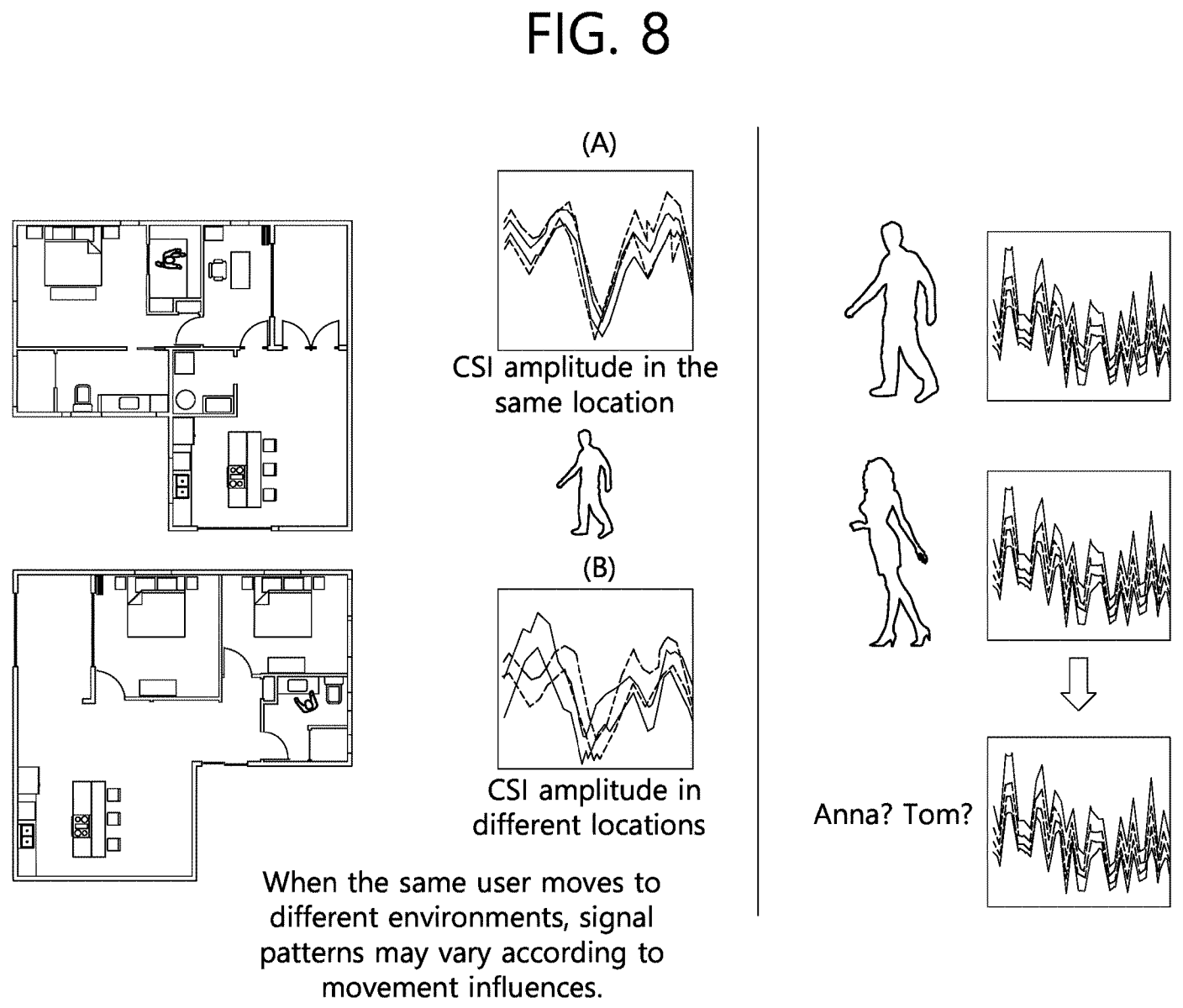

CSI amplitude in different locations

When the same user moves to different environments, signal patterns may vary according to movement influences.

Anna? Tom?

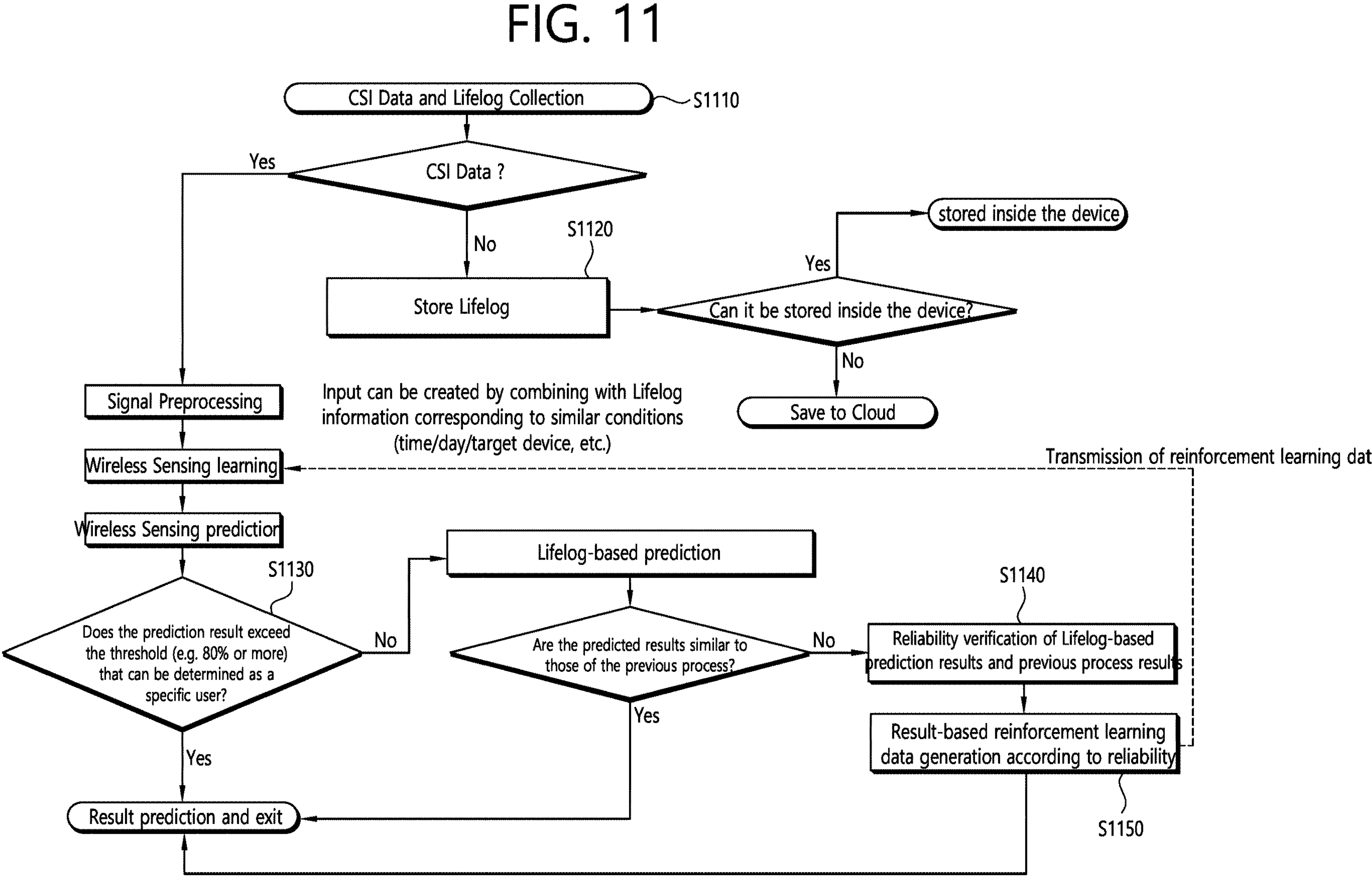
FIG. 11
CSI Data and Lifelog Collection
S1110
CSI Data ?
Yes
No
S1120
Store Lifelog
Can it be stored inside the device?
Yes
stored inside the device
No
Save to Cloud
Signal Preprocessing
Input can be created by combining with Lifelog information corresponding to similar conditions (time/day/target device, etc.)
Wireless Sensing learning
Transmission of reinforcement learning data
Wireless Sensing prediction
S1130
Does the prediction result exceed the threshold (e.g. 80% or more) that can be determined as a specific user?
No
Lifelog-based prediction
Are the predicted results similar to those of the previous process?
No
S1140
Reliability verification of Lifelog-based prediction results and previous process results
Yes
Result-based reinforcement learning data generation according to reliability
S1150
Yes
Result prediction and exit CSI
Smart ThinQ
AI Predictio N
AI Data
Lifelog
Input
Feature Extraction
Feature Set
Input
learning model
prediction
Anna 48%
Tom 43%
David 5%
prediction result
Tom

METHOD AND DEVICE FOR PERFORMING WIRELESS SENSING BASED ON WIRELESS SENSING

CROSS-REFERENCE TO RELATED APPLICATIONS

This application is the National Stage filing under 35 U.S.C. 371 of International Application No. PCT/KR2021/000043, filed on Jan. 5, 2021, the contents of which are all hereby incorporated by reference herein in their entirety.

TECHNICAL FIELD

The present specification relates to a method for identifying a user based on wireless sensing, and more particularly, to a method and apparatus in which a wireless device performs wireless sensing using a lifelog BACKGROUND As wireless technology and sensing methods advance, many studies use wireless signals (for example, WiFi) to detect human activity, it has succeeded in realizing various fields of application, intrusion detection, daily activity recognition, vital sign monitoring related to more granular motion detection and gesture recognition for user identification, etc.

These applications can support a variety of domains for smart home and office environments, including safety protection, wellness monitoring/management, smart healthcare, and smart appliance interactions.

Human movement affects wireless signal propagation (e.g., reflection, diffraction, and scattering), providing an excellent opportunity to capture human movement by analyzing the received wireless signal. Because of its frequency-shifting, low-cost, and non-intrusive detection properties, whether researchers extract ready-to-use signal measurements or adopt frequency-modulated signals, wireless-based human activity detection has attracted considerable interest and has become a prominent research area in the past decade.

This specification examines the existing wireless sensing system in terms of basic principle, technology and system architecture. Specifically, this specification describes how wireless signals can be utilized to facilitate a variety of applications including intrusion detection, room occupancy monitoring, daily activity recognition, gesture recognition, vital sign monitoring, user identification and indoor location. Future research directions and limitations of using wireless signals for human activity detection are also discussed.

SUMMARY

The present specification proposes a method and apparatus for performing wireless sensing based on wireless sensing.

An example of the present specification proposes a method in which a wireless device performs wireless sensing by utilizing a lifelog.

This embodiment proposes a method of increasing the accuracy of a learning model or user identification through a predicted result additionally using a lifelog if a wireless device based on wireless sensing is not capable of identifying a user (or recognizing a user) with only the signal pattern of a wireless signal. Through this embodiment, it is possible to implement a system that can have sufficient accuracy of human recognition and user identification in the user's home environment, so a new paradigm of IoT future smart home devices such as 'artificial intelligence devices that recognize and identify people' can be created.

A wireless device collects Channel State Information (CSI) data and a lifelog. The CSI data may be obtained based on a wireless signal received by the wireless device. The lifelog may be obtained from a fixed device, a cloud, or a mobile device.

The lifelog obtained from the fixed device may include room temperature, device operation, current time or date. The lifelog obtained from the cloud may include current weather, outside temperature, or calendar schedule information. The lifelog obtained from the mobile device may be application usage information or alarm information.

The wireless device obtains a first user estimation result by learning and predicting based on the CSI data.

The wireless device predicts a second user estimation result based on the lifelog when the first user estimation result is less than or equal to a threshold value.

According to the embodiments proposed in this specification, it is possible to implement a system that can sufficiently achieve human recognition and user identification accuracy in a user's home environment by performing a reinforcement learning and prediction method using a lifelog, so there is a new effect that can create a new paradigm of IoT future smart home devices such as 'artificial intelligence devices that recognize and identify people'.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 8 illustrates a problem that arises when a wireless sensing-based device performs a sensing and identification operation using only a signal pattern.

FIG. 11 shows an overall flowchart of a procedure in which a wireless sensing device performs learning and prediction by utilizing a lifelog.

DETAILED DESCRIPTION

Figure 3:
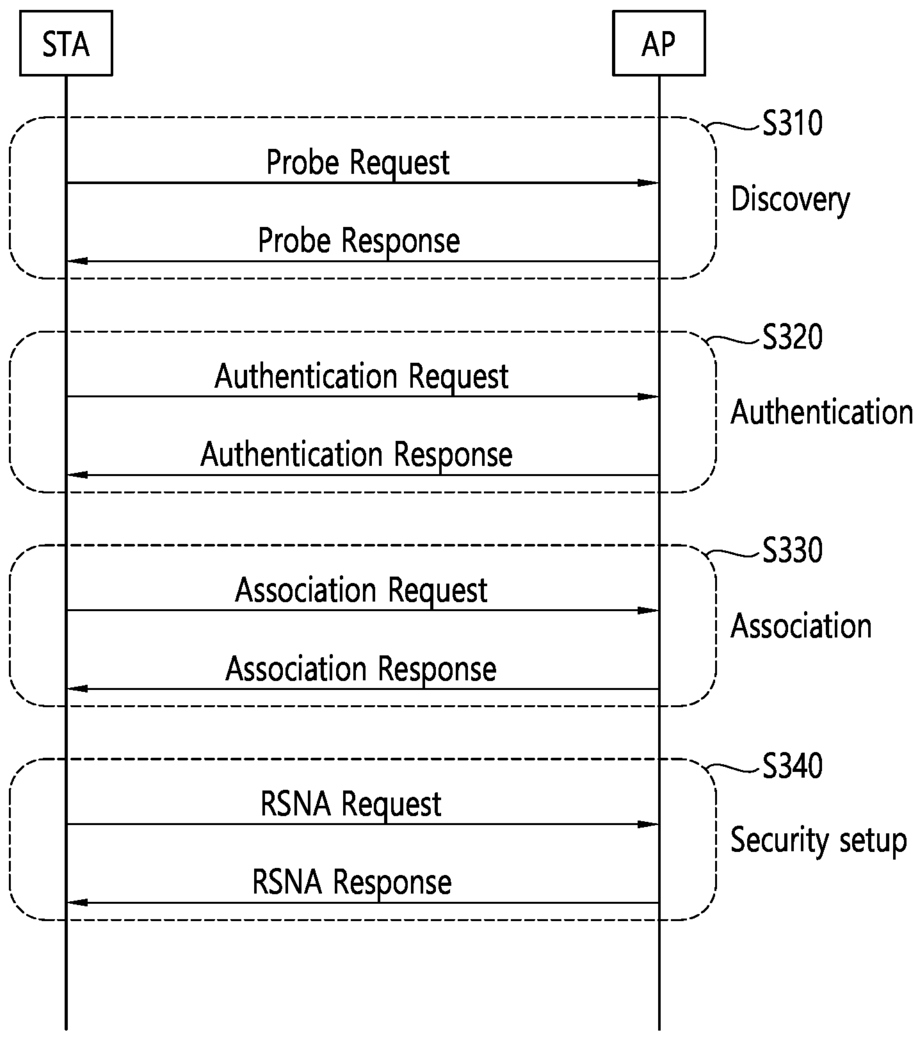
FIG. 3 is a drawing for explaining a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may also be indicated as an AP STA.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm@, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e., IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 is a drawing for explaining a general link setup process.

In the illustrated step S310, the STA may perform a network discovery operation. The network discovery operation may include a scanning operation of the STA. That is, in order for the STA to access the network, the STA needs to find a network in which it can participate. An STA must identify a compatible network before participating in a wireless network. The process of identifying a network existing in a specific area is called scanning. Scanning methods include active scanning and passive scanning.

FIG. 3 exemplarily illustrates a network discovery operation including an active scanning process. In active scanning, an STA performing scanning transmits a probe request frame to discover which APs exist around it while moving channels, and waits for a response thereto. A responder transmits a probe response frame to the STA that has transmitted the probe request frame in response to the probe request frame. Here, the responder may be an STA that last transmitted a beacon frame in the BSS of the channel being scanned. In the BSS, since the AP transmits a beacon frame, the AP becomes the responder. In the IBSS, the STAs in the IBSS rotate and transmit the beacon frame, so the responder is not constant. For example, an STA that has transmitted a probe request frame on channel 1 and received a probe response frame on channel 1 stores BSS-related information included in the received probe response frame, The STA may move to the next channel (e.g., channel 2) and perform scanning (i.e., probe request/response transmission/reception on channel 2) in the same manner.

Although not shown in the example of FIG. 3, the scanning operation may be performed in a passive scanning manner. An STA performing scanning based on passive scanning may wait for a beacon frame while moving channels. The beacon frame is one of the management frames in IEEE 802.11, and is periodically transmitted to inform the existence of a wireless network, and to allow a scanning STA to search for a wireless network and participate in the wireless network. In the BSS, the AP plays a role of periodically transmitting a beacon frame, and in the IBSS, the STAs in the IBSS rotate and transmit the beacon frame. When the STA performing scanning receives the beacon frame, it stores information on the BSS included in the beacon frame and records the beacon frame information in each channel while moving to another channel. Upon receiving the beacon frame, the STA may store BSS-related information included in the received beacon frame, move to the next channel, and perform scanning on the next channel in the same manner.

The STA discovering the network may perform an authentication process through step SS320. This authentication process may be referred to as a first authentication process in order to clearly distinguish it from the security setup operation of step S340 to be described later. The authentication process of S320 may include a process in which the STA transmits an authentication request frame to the AP, and in response, the AP transmits an authentication response frame to the STA. An authentication frame used for an authentication request/response corresponds to a management frame.

The authentication frame may include information on an authentication algorithm number, an authentication transaction sequence number, a status code, a challenge text, a Robust Security Network (RSN), and a Finite Cyclic Group, etc.

The STA may transmit an authentication request frame to the AP. The AP may determine whether to allow authentication for the STA based on information included in the received authentication request frame. The AP may provide the result of the authentication process to the STA through the authentication response frame.

The successfully authenticated STA may perform a connection process based on step S330. The association process includes a process in which the STA transmits an association request frame to the AP, and in response, the AP transmits an association response frame to the STA. For example, the connection request frame may include information related to various capabilities, a beacon listening interval, a service set identifier (SSID), supported rates, supported channels, RSN, and mobility domain, supported operating classes, TIM broadcast request (Traffic Indication Map Broadcast request), interworking service capability, and the like. For example, the connection response frame includes information related to various capabilities, status codes, Association IDs (AIDs), support rates, Enhanced Distributed Channel Access (EDCA) parameter sets, Received Channel Power Indicator (RCPI), Received Signal to Noise (RSNI). indicator), mobility domain, timeout interval (association comeback time), overlapping BSS scan parameters, TIM broadcast response, QoS map, and the like.

Thereafter, in step S340, the STA may perform a security setup process. The security setup process of step S340 may include, for example, a process of private key setup through 4-way handshaking through an Extensible Authentication Protocol over LAN (EAPOL) frame.

As the demand for wireless data traffic increases, WiFi networks grow very rapidly as they provide high throughput and are easy to deploy. Recently, Channel State Information (CSI) measured by a WiFi network is widely used for various sensing purposes. In order to better understand the existing WiFi sensing technology and the future WiFi sensing trend, this specification comprehensively reviews the signal processing technology, algorithm, application, and performance results of WiFi sensing using CSI. Different WiFi sensing algorithms and signal processing technologies have their own advantages and limitations and are suitable for different WiFi sensing applications. This specification classifies CSI-based WiFi sensing applications into three categories: sensing, recognition, and estimation according to whether the output is binary/multi-class classification or numeric. With the development and deployment of new WiFi technologies, there will be more WiFi sensing opportunities where objects can move from humans to the environment, animals and objects.

This specification emphasizes the coexistence of three challenges in WiFi sensing: robustness and generalization, privacy and security, and WiFi sensing and networking. In addition, this specification proposes three future WiFi sensing trends: inter-layer network information integration, multi-device cooperation, and convergence of different sensors to enhance the existing WiFi sensing function and enable new WiFi sensing opportunities.

With the growing popularity of wireless devices, WiFi is growing very rapidly. One of the key technologies for WiFi's success is Multiple-Input Multiple-Output (MIMO), which provides high throughput to meet the growing demand for wireless data traffic. Together with Orthogonal Frequency-Division Multiplexing (OFDM), MIMO provides channel state information (CSI) for each transmit/receive antenna pair at each carrier frequency. Recently, CSI measurement of WiFi systems is used for various sensing purposes. WiFi sensing reuses the infrastructure used for wireless communication, making deployment easy and low cost. Also, unlike sensor-based and video-based solutions, WiFi sensing does not interfere with lighting conditions.

CSI refers to how a radio path propagates from a transmitter to a receiver at a specific carrier frequency along multiple paths. For WiFi systems with MIMO-OFDM, CSI is a 3D matrix of complex values representing the amplitude attenuation and phase shift of a multipath WiFi channel.

Time series of CSI measurements can be used for other wireless sensing applications by capturing how wireless signals travel through surrounding objects and people in time, frequency, and spatial domains. For example, CSI amplitude fluctuations in the time domain have different patterns depending on human, activity, gesture, etc., which can be used for human presence detection, fall detection, motion detection, activity recognition, gesture recognition, and human identification/authentication.

CSI phase shift in the spatial and frequency domains, i.e., transmit/receive antenna and carrier frequencies, is related to signal transmission delay and direction, which can be used for human location and tracking. The CSI phase shift in the time domain can have other dominant frequency components that can be used to estimate the respiration rate. Various WiFi sensing applications have specific requirements for signal processing techniques and classification/estimation algorithms.

This specification proposes signal processing technologies, algorithms, applications, performance results, challenges, and future trends of WiFi sensing through CSI to increase understanding of existing WiFi sensing technologies and gain insight into future WiFi sensing directions.

Figure 4:
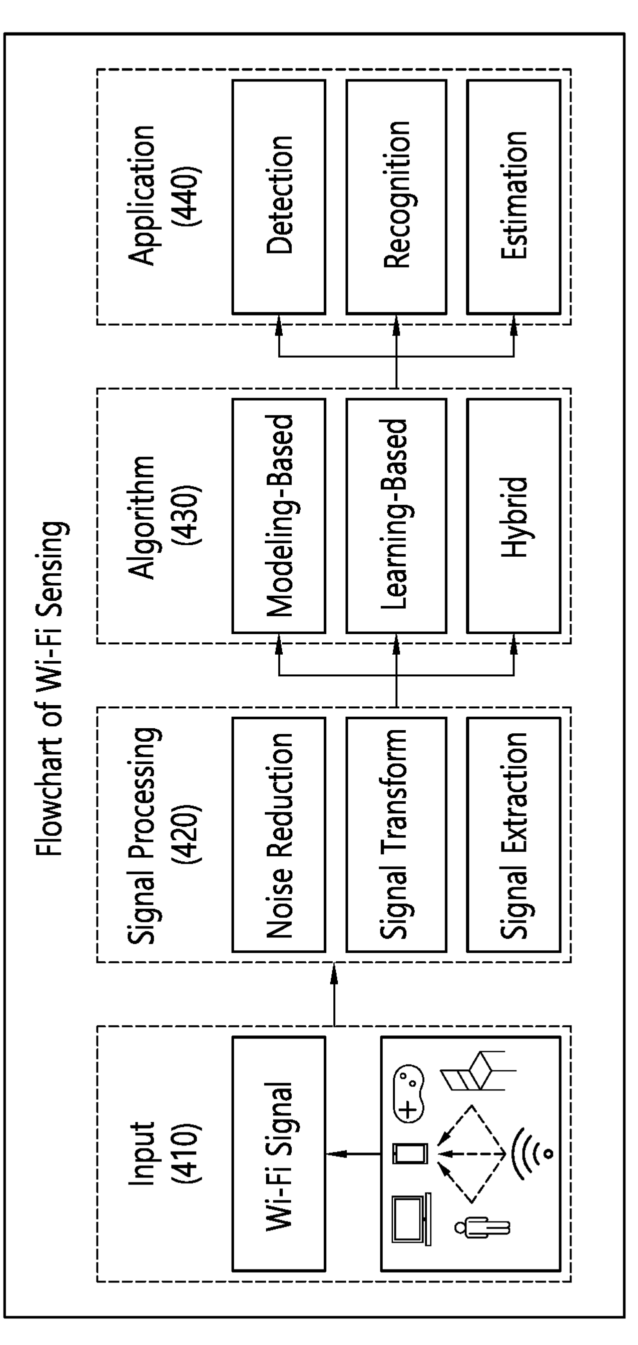
FIG. 4 shows a flowchart of a WiFi sensing procedure.

FIG. 4 shows a flowchart of a WiFi sensing procedure.

A WiFi signal (e.g., CSI measurement value) including a mathematical model, a measurement procedure, an actual WiFi model, a basic processing principle, and an experimental platform is input from the Input stage 410. Raw CSI measurements are fed to a signal processing module for noise reduction, signal conversion and/or signal extraction as indicated by the Signal Processing stage 420.

The pre-processed CSI tracking is supplied as a modeling-based, learning-based or hybrid algorithm, such as the Algorithm stage 430, to obtain an output for various WiFi sensing purposes. Depending on the output type, WiFi sensing can be classified into three categories. At the Application stage 440, the detection/recognition application tries to solve the binary/multi-class classification problem, and the estimation application tries to obtain the quantity values of other tasks.

Figure 5:
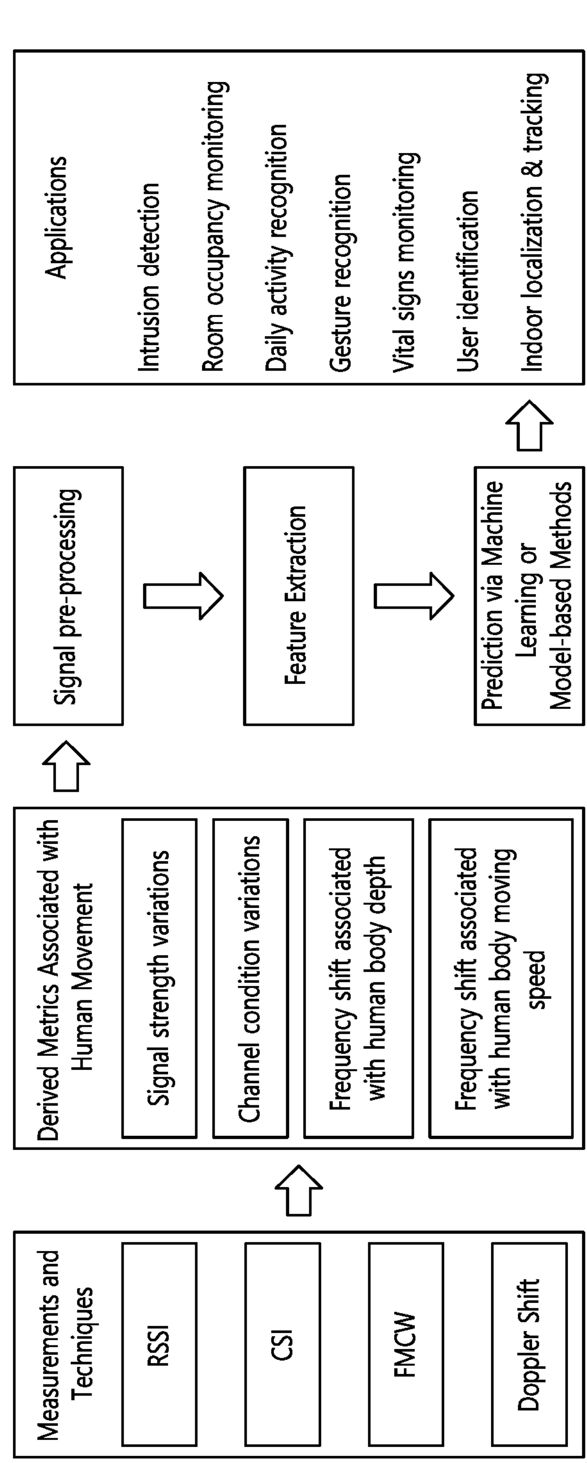
FIG. 5 shows a flow diagram of a general procedure of sensing human activity through a wireless signal.

FIG. 5 shows a flow diagram of a general procedure of sensing human activity through a wireless signal.

Specifically, the sensing system extracts signal changes related to human activity first based on different sensing methods (e.g., Received Signal Strength Indicator (RSSI), Channel State Information (CSI), Frequency Modulated Carrier Wave (FMCW) and Doppler shift).

That is, the human activity sensing procedure of FIG. 5 is as follows.

1) Measurements: Measure RSSI, CSI, Doppler shift, etc. as input values
2) Derived Metrics with Human movements: Signal strength variations, Channel condition variations, Frequency shift associated with human body depth, Frequency shift associated with human moving speed
3) Signal Pre-processing: Noise reduction, Signal Time-Frequency Transform, Signal Extraction
4) Feature Extraction: Extracts user ID features using gait cycle, body speed, and human activity
5) Prediction via Machine/Deep learning: Algorithms
6) Application: Detection, Recognition, Estimation (Intrusion detection, Room occupancy monitoring, Daily activity recognition, Gesture recognition, Vital signs monitoring, User identification, Indoor localization & tracking) of User identification prediction model 1. Wireless Sensing, Wi-Fi, Machine Learning <Background of the Disclosure>

The IoT future smart home market is changing from device connection-centric to service-centric, and as a result, the need for AI device-based personalization and automation services is increasing. Wireless sensing-based technology, which is one of the element technologies for IoT service of artificial intelligence devices, is being actively developed. Among them, research on user identification by learning the pattern of a wireless signal such as Wi-Fi has unique characteristics according to a person's gait or behavior is being actively conducted.

<Background Technology and Problems>

In order to mount Wireless Sensing-based User Identification technology on commercial products, it is difficult to learn and distribute a model for prediction of data collected in Machine Learning in advance. (For example, a model that predicts dogs and cats is learned and deployed in advance and predicted new images not used in learning). The wireless signal may vary depending on the environment, even for the same user, as the signal pattern is different according to the influence of the user's movement. For this reason, since it is not possible to generate and distribute a general model in advance, it is necessary to create a model through learning suitable for each environment in order to mount a commercial product. However, prior learning using supervised learning used in existing research requires user participation for the collection and labeling of learning data (matching the correct answer of the data), so the practicality of commercialization is low.

Therefore, the present specification proposes a post-learning automation method for wireless sensing-based user identification.

When learning the wireless sensing signal pattern suitable for each environment, it enables post-learning by collecting the correct answer (e.g., label) for learning using the personal identification information of the user device (Personal Electronic Device—PED). The learning method for post-learning may be applied to various methods such as unsupervised learning, supervised learning, semi-supervised learning, and unsupervised/supervised fusion learning.

Through this embodiment, it is possible to implement a system that predicts by learning a signal pattern suitable for the user's home environment, thereby creating a new paradigm of IoT future smart home devices such as artificial intelligence devices that identify people.

<Example of Wi-Fi CSI-Based User Identification Study>

An example of a study for learning/predicting using Wi-Fi CSI using wireless signal refinement, feature extraction, and machine learning is as follows.

1) Signal Pre-Processing
   - CSI measurement collection—Collect CSI measurement values of 30-52 subcarriers based on 20 MHz bandwidth as many as the number of TX/RX antennas.
   - Denoising—Removes noise from signals using algorithms such as PCA (Principal Component Analysis), phase unwrapping, and band-pass Butterworth filter.
   - Transform to Time-Frequency domain—Spectrogram generation using STFT (Shot-Time Fourier Transform) (refer to FIG. 6)->The denoising waveform is mixed with the reflection shape of the human body part, which can be classified by frequency.

Figure 6:
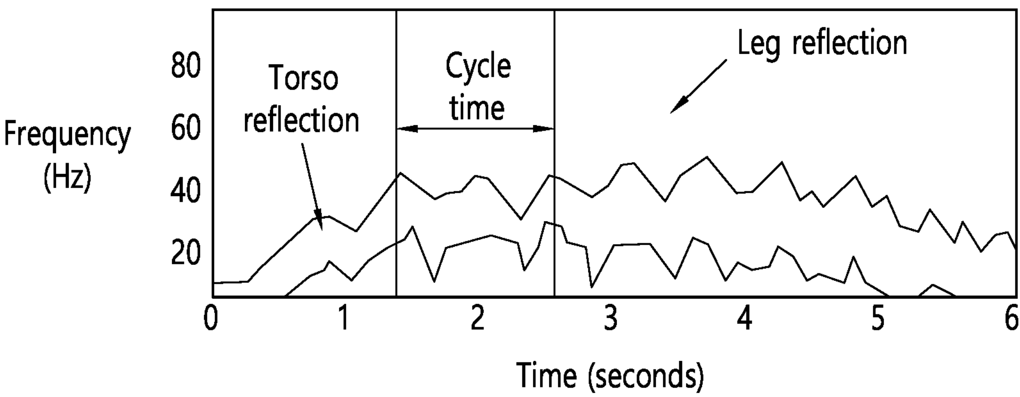
FIG. 6 shows a CSI spectrogram according to a human gait.

FIG. 6 shows a CSI spectrogram according to a human gait.

Referring to FIG. 6, torso reflection and leg reflection are illustrated in a CSI spectogram in a time/frequency domain. In this case, the CSI spectogram has a certain cycle time.

2) Feature Extraction
   - The process of extracting features for user identification learning and prediction
   - Use Gait Cycle Time, Movement (or Torso) Speed, Human Activity, etc.
   - Based on the theory that the gait cycle is unique to each person, it is used as a feature of User Identification
   - Example of body velocity estimation method: using the percentile method used in Doppler Radar
   - Example of Human Activity estimation method: Predicting human movements and contours using time domain features (max, min, mean, skewness, kurtiosis, std), which are low level features of CSI; Predicting the movement speed of the trunk and legs using frequency domain features (spcetrogram energy, percentile frequency component, spectrogram energy difference); and Expressing walking or stationary activities using these features.

3) Machine/Deep Learning Based Training and Prediction
   - Learning and prediction through various machine/deep learning-based algorithms
   - Representative Algorithm
   - i) Supervised Learning: Using machine learning and deep learning learning algorithms such as decision tree-based machine learning classifier, SVM (Support Vector Machine), Softmax classifier, etc.
   - i)-1 The predictive model is created only by supervised learning, and the unsupervised learning algorithm is used to construct the layers of the supervised learning model (some studies)

Learning Method
   - i) Select Training/Evaluation data at a specific ratio by collecting data under specific environmental conditions for each person (e.g., Training data: Evaluation data=8:2)->Holdout verification ii) Training data is trained by manually mapping the correct answer (e.g. Label) for each person and using it as an input for the Machine/Deep learning model.

iii) In some studies, auto feature extraction and clustering are performed using unsupervised learning to increase the degree of freedom of the data collection environment, and then user identification is performed using a supervised learning model (e.g., Softmax classifier).

Unsupervised learning is a learning method in which only the problem is studied without teaching the answer (label). According to unsupervised learning, the answer is found by clustering (a typical example of unsupervised learning), etc. based on the relationship between variables (e.g., recommending a YouTuber, classifying animals).

In contrast, supervised learning is a learning method that teaches and studies answers. Supervised learning is divided into regression and classification. Regression is a learning method that predicts outcomes within a continuous data range (e.g., age 0-100). Classification is a learning method that predicts outcomes within a range of discretely separated data (for example, whether a tumor is malignant or benign).

In addition, semi-supervised learning is a method of learning data with and without answers at the same time, and it is a learning method that studies a lot of data without answers without discarding them.

Figure 7:
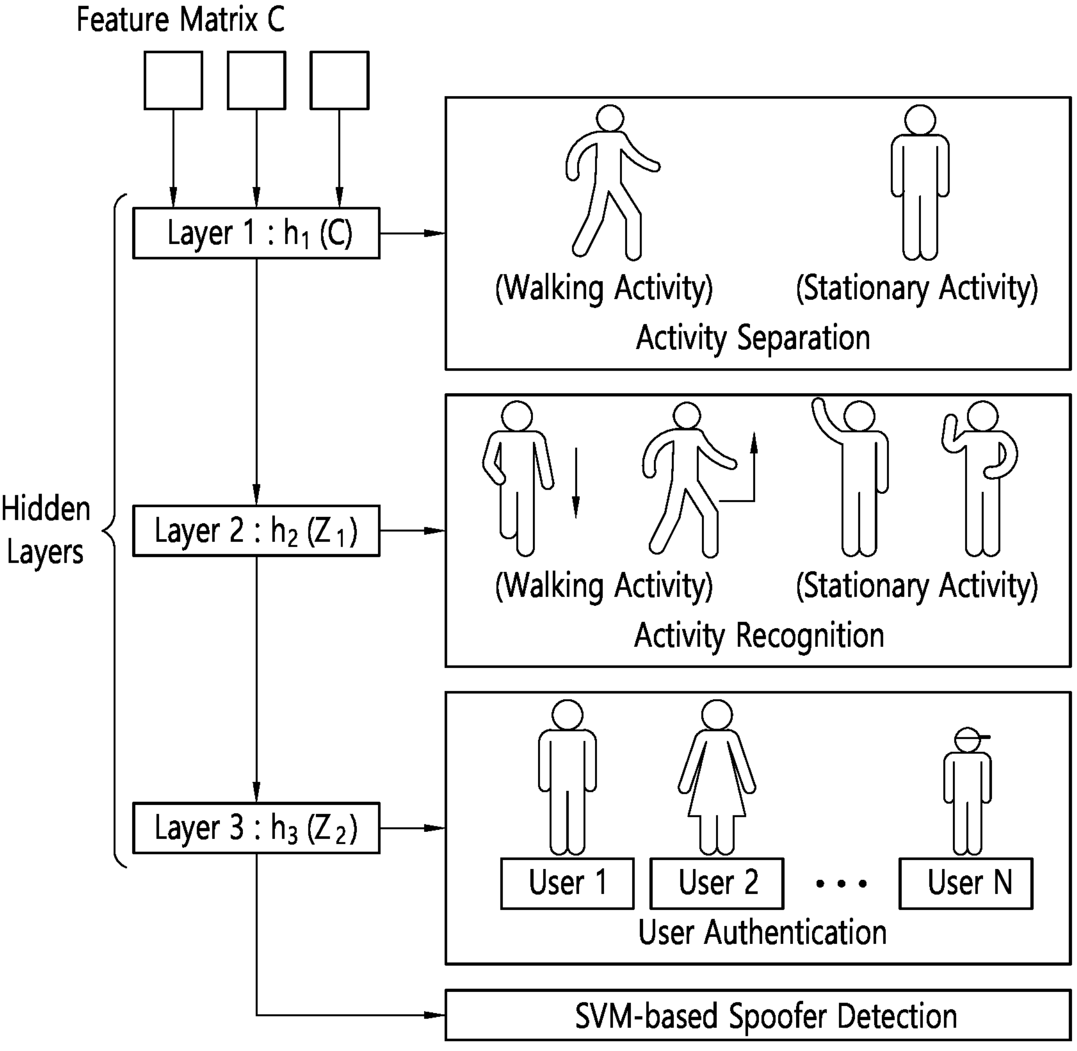
FIG. 7 shows a deep learning architecture for user authentication.

FIG. 7 shows a deep learning architecture for user authentication.

The deep learning architecture of FIG. 7 is an example of performing auto feature extraction using an autoencoder for each hidden layer and using softmax classification for classification.

Referring to FIG. 7, the supervised learning model constitutes each hidden layer, and the unsupervised learning model is used only for constructing the corresponding layer. Activity Separation, Activity Recognition, and User Authentication of FIG. 7 are all characteristics obtained by auto feature extraction.

2. Detailed Description of the Specification

<Background of Disclosure>

The IoT future smart home market is changing from device connection-oriented to service-oriented, and as a result, the need for artificial intelligence device-based personalization and automation services is increasing. Development of wireless sensing-based technology, which is one of the element technologies for IoT service of artificial intelligence devices, is being actively developed. Among them, research on human recognition and user identification by learning the pattern of this signal using the fact that changes in wireless signals such as Wi-Fi have unique characteristics according to human gait or behavior is being actively conducted.

<Prior Art and Problems>

In the existing research on wireless sensing-based human recognition and user identification technology, detection and identification are performed using wireless signal patterns (Wi-Fi CSI, etc.). Since wireless signals can have different signal patterns depending on the user's movement depending on the environment, even for the same user, it is difficult to have good performance in various environments, making it less practical in terms of commercialization. The signal pattern of the wireless signal alone causes a lack of performance such as accuracy to identify a user.

Therefore, this specification proposes a method for improving Wireless Sensing learning and prediction performance using Lifelog. Here, the lifelog means a record of an individual's daily life, 'a record or information of an individual's overall daily life' in a broad sense, and is specifically used for the purpose of acquiring or managing daily records.

Specifically, Wireless Sensing devices utilize Lifelog to improve Wireless Sensing prediction performance. In addition, the Wireless Sensing device provides input data to increase the accuracy of the learning model through predicted results using Lifelog. As a result, through the proposed method, it is possible to implement a system that can have sufficient accuracy of human recognition and user identification in the user's home environment, so that a new paradigm of IoT future smart home such as 'artificial intelligence device that recognizes and identifies a person' device can be created.

When user identification technology through wireless sensing is applied to commercial products, high accuracy may not be secured depending on various reasons such as environment, device arrangement, characteristics of each user, and amount of data collected for learning. The proposed method has the purpose of solving with prediction and reinforcement learning using additional information to secure high accuracy, which is a very important factor in wireless sensing-based user identification technology.

According to the proposed method, more accurate user identification accuracy can be provided from a commercial point of view by providing an identification process using life-log in addition to user identification through wireless sensing. A more accurate result can be inferred by combining the results through the weight of the mutual results than in the case of user identification in each process. Through this, it can be used for applications that require high identification accuracy, such as surveillance and safe return mode, as well as general device personalization services with accurate personal identification while taking advantage of the advantages of wireless sensing (Device-Free, Natural).

Existing protocols based on Wireless Sensing and existing operation methods are described as follows. 1) The transmitting device transmits a signal that can be measured such as Wi-Fi CSI (Channel State Information). 2) The receiving device measures the CSI wireless signal sent from the transmitting device. 3) The transmitting and receiving devices perform wireless signal pre-processing to refine the collected signal. 4) The transmitting and receiving devices perform a process of extracting features for learning and prediction (Feature Extraction). 5) The transmitting and receiving device divide the data set that has gone through Wireless Signal Pre-processing and Feature Extraction into an appropriate ratio (e.g., 8:2), uses a large ratio as data input for learning, and uses the remaining data for evaluation of the learning model.

FIG. 8 illustrates a problem that arises when a wireless sensing-based device performs a sensing and identification operation using only a signal pattern.

That is, since the wireless signal may have different signal patterns depending on the user's motion depending on the environment, even for the same user, it is difficult to have good performance in various environments, and practicality in terms of commercialization is poor.

In addition, even if the signal patterns of different users are not identical only with the signal pattern of the wireless signal, it may be difficult to recognize and identify similar cases.

Therefore, this specification proposes a method for improving Wireless Sensing learning and prediction performance by utilizing Lifelog. The description of the life log is as follows.

1) Definition of Lifelog: A log of an individual's daily life

2) Example of Lifelog

Information obtained from fixed devices: room temperature, device operation, current time, date, etc.

Information obtained from Cloud: current weather, outside temperature, calendar schedule information, etc.

Information obtained from mobile devices: App usage information (time, type, etc.), alarm information, etc.

3) How to collect Lifelog

Devices that can save Lifelog are collected in the device and used immediately when necessary.

For devices that cannot store Lifelog, use the Cloud to store the collected information outside the device and receive it when necessary.

4) How to use Lifelog

Predict users in the current situation through Lifelog.

e.g. At 2:00 PM, 150 ml water is dispensed from the water purifier, weekdays->The current user can be predicted as Anna.

e.g. If the predicted user is predicted to be Anna or Tom with a similar probability->It is possible to predict whether it is Anna or Tom by using each user's calendar schedule information.

Figure 9:
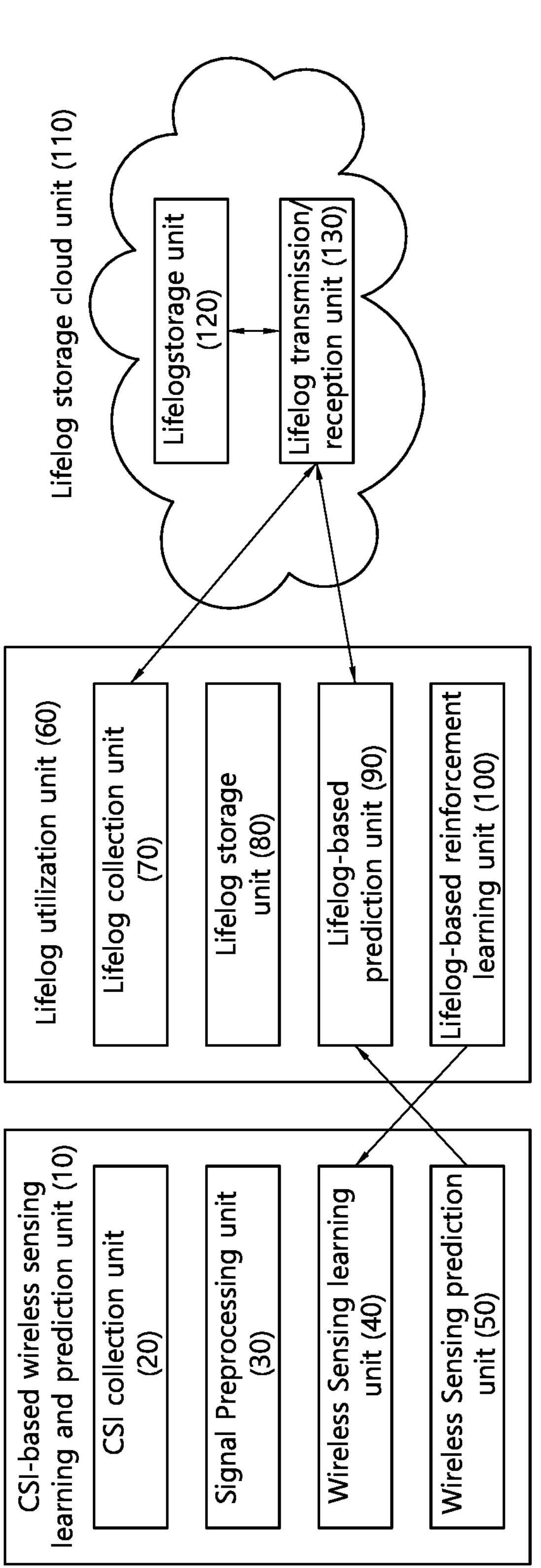
FIG. 9 shows a block diagram of a functional unit of a wireless sensing device utilizing a lifelog.

FIG. 9 shows a block diagram of a functional unit of a wireless sensing device utilizing a lifelog.

FIG. 9 shows a wireless sensing learning and prediction performance improvement function using lifelog, and the function of FIG. 9 is largely a CSI-based wireless sensing learning and prediction unit 10 and a lifelog utilization unit 60 and a Lifelog storage Cloud unit 110. The functional unit shown in FIG. 9 can be defined as follows.

First, the CSI-based wireless sensing learning and prediction unit 10 includes a CSI collection unit 20, a signal preprocessing unit 30, a wireless sensing learning unit 40, and a wireless sensing prediction unit 50. The CSI collection unit 20 serves to collect CSI by receiving a wireless signal. The Signal Preprocessing unit 30 serves to preprocess the collected CSI Data (De-noising, etc.). The wireless sensing learning unit 40 performs machine/deep learning with preprocessed data and serves to create a learning model. The Wireless Sensing prediction unit 50 serves to predict a result using a learning model.

In addition, the Lifelog utilization unit 60 includes a Lifelog collection unit 70, a Lifelog storage unit (device) 80, a Lifelog-based prediction unit 90 and a lifelog-based reinforcement learning unit 100. The lifelog collection unit 70 serves to obtain and collect information from fixed devices, clouds, and mobile devices. The lifelog storage unit (device) 80 serves to store the collected lifelog. The lifelog-based predictor 90 serves to predict based on the stored lifelog. The lifelog-based reinforcement learning unit 100 serves to process and deliver data for reinforcement learning of an existing learning model according to a lifelog prediction result.

In addition, the lifelog storage cloud unit 110 includes a lifelog storage unit (Cloud) 120 and a lifelog transmission/reception unit 130. The lifelog storage unit (Cloud) 120 serves to store the collected lifelogs. The lifelog transceiver 130 serves to transmit and receive lifelogs collected from devices.

Figure 10:
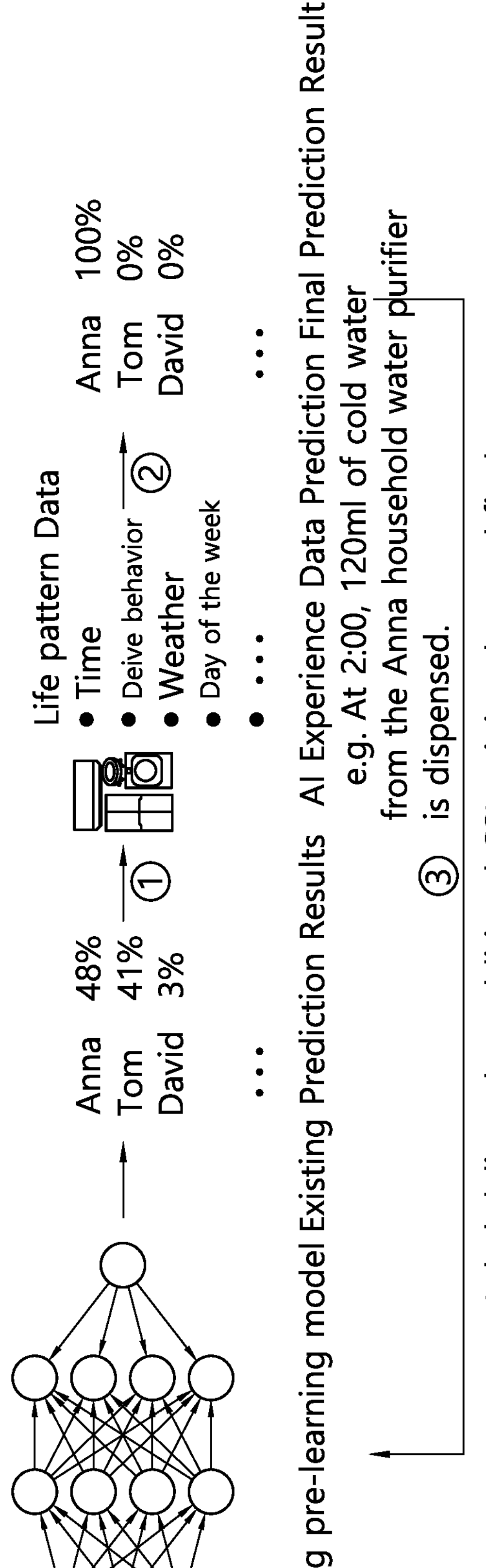
FIG. 10 shows an example of a procedure in which a wireless sensing device performs learning and prediction using a lifelog.

FIG. 10 shows an example of a procedure in which a wireless sensing device performs learning and prediction using a lifelog.

The entire flow of the procedure shown in FIG. 10 consists of an existing wireless sensing learning model, Artificial Intelligence (AI) experience data prediction, and additional learning. Existing wireless sensing learning means machine/deep learning for user identification (e.g. User Identification using difference in gait of each user through Wi-Fi CSI signal) through wireless sensing.

When the probability of the existing prediction result is low, the wireless sensing device proceeds with accurate prediction by using Lifelog. At this time, since the same situation can be produced for different users with the results of Lifelog, the wireless sensing device predicts the final result by combining the results of the existing pre-learning model. Wireless Sensing devices carry out reinforcement learning by transferring predicted results using Lifelog to the existing pre-learning model.

In step 1 of FIG. 10 (after obtaining the previous prediction result), the wireless sensing device does not accept the wireless signal-based user estimation result as it is, and defines a threshold to accept only when the estimation result is X % or more. If the estimation result is above the threshold, the user is identified as the corresponding user, and if it is below the threshold, lifelog-based prediction is additionally performed.

If Lifelog-based prediction (data prediction due to AI experience) is additionally performed in step 2 of FIG. 10, the wireless sensing device derives the final result by weighting the wireless signal-based estimation result and the lifelog-based estimation result.

In step 3 of FIG. 10, the wireless sensing device performs labeling based on the final result and provides input data for learning to the existing pre-learning model to perform reinforcement learning and improve performance.

FIG. 11 shows an overall flowchart of a procedure in which a wireless sensing device performs learning and prediction by utilizing a lifelog.

In step S1110, the wireless sensing device collects CSI by receiving the wireless signal, and collects lifelogs by obtaining information from fixed devices, clouds, and mobile devices.

In step S1120, the collected lifelogs may be stored inside the device or stored in the cloud.

The wireless sensing device preprocesses the CSI collected in step S1110, performs machine/deep learning with the preprocessed data, creates a learning model, and predicts a result using the learning model.

In step S1130, it is checked whether the predicted result exceeds a threshold value (e.g., 80% or more) that can be concluded as a specific user, and if it exceeds the threshold value, the result prediction is terminated. Further prediction is made based on the saved lifelog. However, if the additional prediction result based on the lifelog is similar to the existing prediction result, the result prediction may be terminated. When the additional prediction result based on the lifelog is not similar to the existing prediction result, step S1140 may be performed.

In step S1140, the wireless sensing device verifies the reliability of the prediction result based on the lifelog and the existing prediction result. The wireless sensing device derives the final result by weighting the wireless signal-based estimation result and the lifelog-based estimation result.

In step S1150, the wireless sensing device generates reinforcement learning data by labeling based on the final result derived according to the reliability in step S1140. In addition, the reinforcement learning data is transmitted or provided as input data for learning to the existing pre-learning model, so that reinforcement learning can be performed and performance can be improved.

Figure 12:
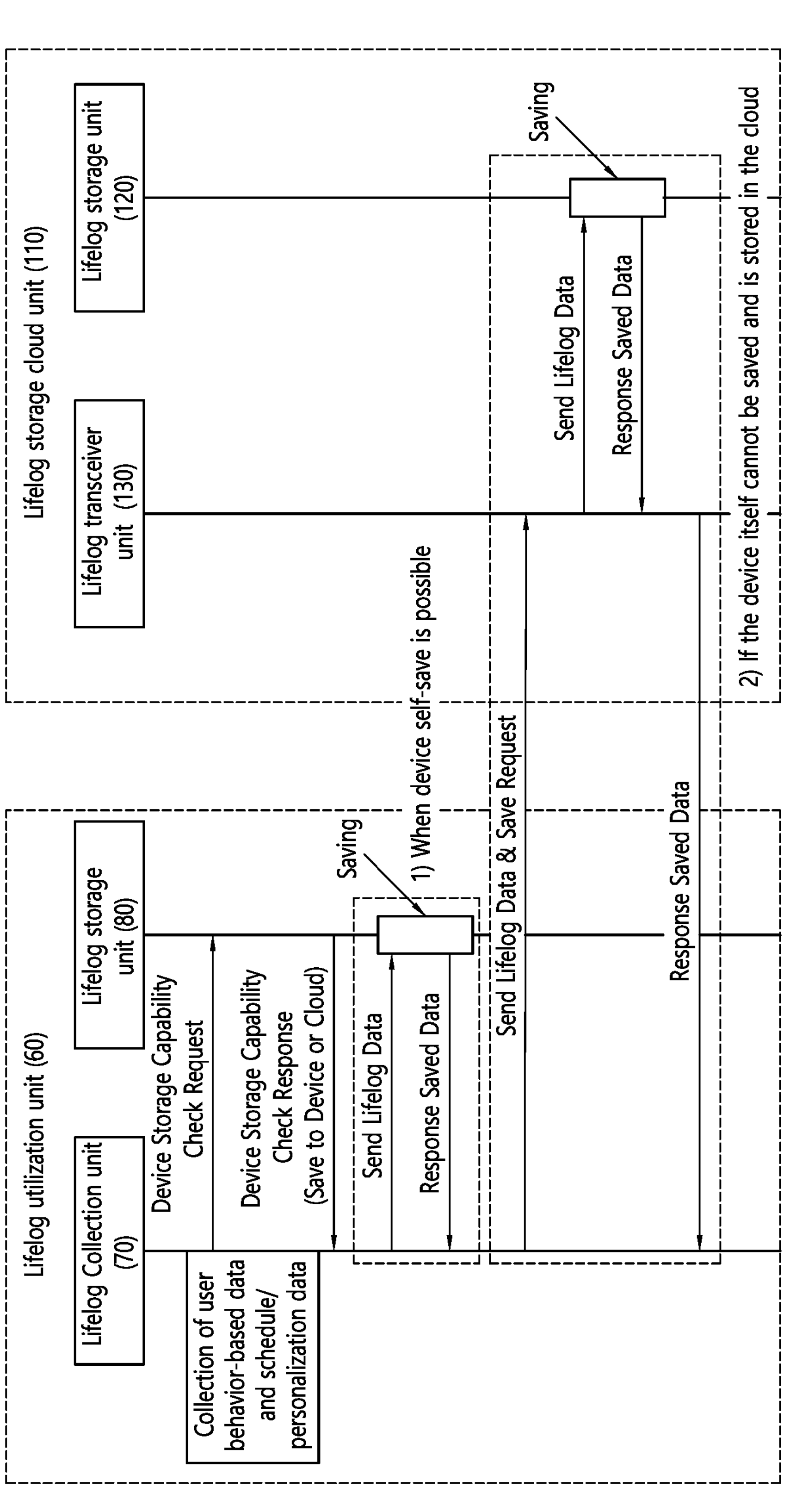
FIG. 12 shows a signaling procedure for saving a lifelog in this embodiment.

FIG. 12 shows a signaling procedure for saving a lifelog in this embodiment.

Referring to FIG. 12, while transmitting and receiving a Device Storage Capability Check Request/Response between the lifelog collection unit 70 and the lifelog storage unit 80, the lifelog collection unit 70 may collect user motion-based data and schedule/personalization data. The Device Storage Capability Check Response may determine whether the lifelog is stored in the device or stored in the cloud.

1) If device self-storage is possible, the lifelog collection unit 70 may transmit lifelog data to the lifelog storage unit 80 and receive a response to the stored data from the lifelog storage unit 80.

2) When storage in the cloud is not possible because the device itself cannot be stored, the lifelog collection unit 70 requests the transfer and storage of the lifelog data to the lifelog transmission and reception unit 130 of the cloud, and the lifelog transmission and reception unit 130 transfers lifelog data to the lifelog storage unit 120, and the lifelog storage unit 120 stores it. The lifelog transceiver 130 receives a response to the stored data from the lifelog storage unit 120, and the lifelog collection unit 70 receives a response to the stored data from the lifelog transceiver 130.

Figure 13:
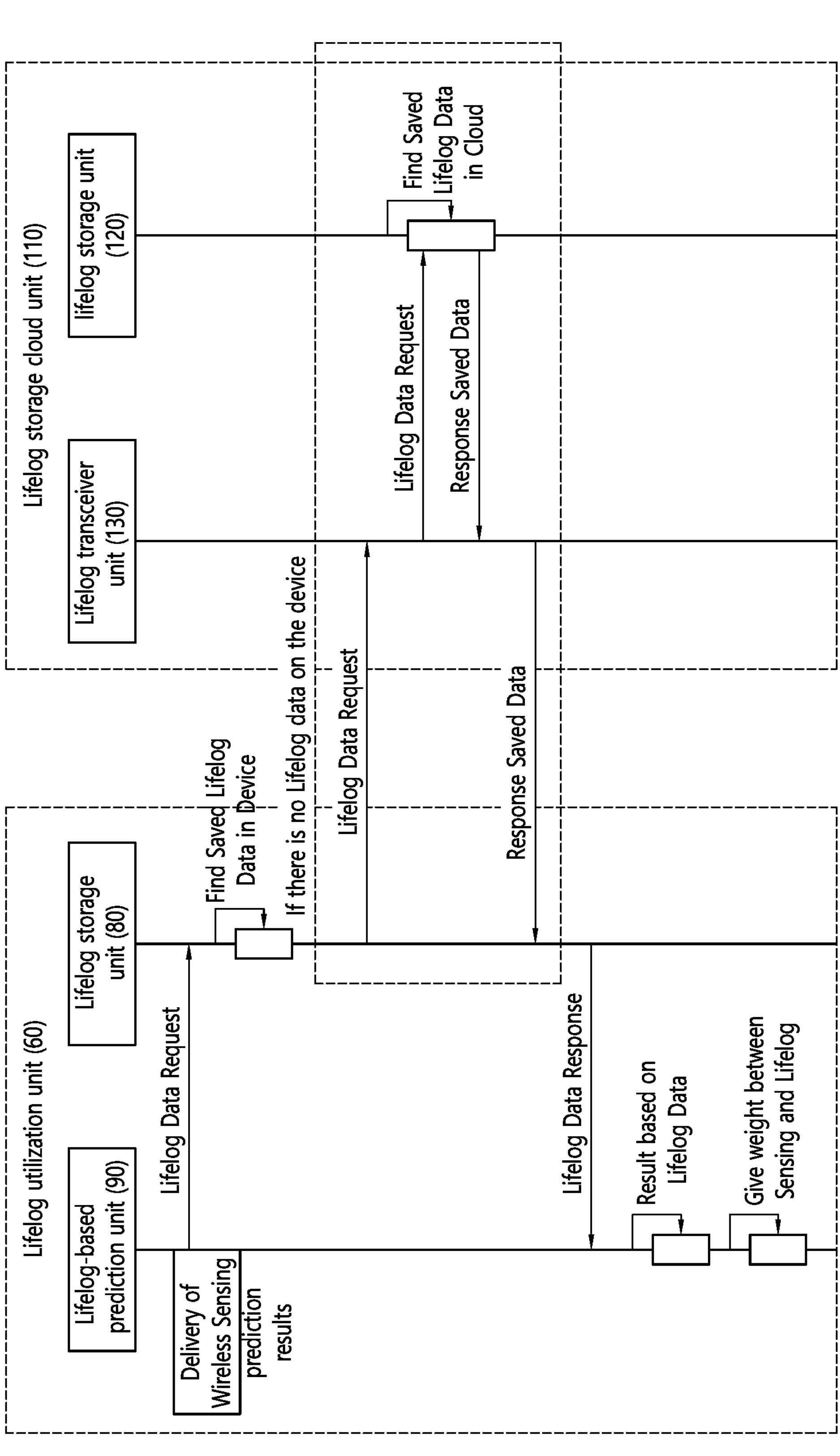
FIG. 13 illustrates a signaling procedure for predicting based on a lifelog in this embodiment.

FIG. 13 illustrates a signaling procedure for predicting based on a lifelog in this embodiment.

The lifelog-based prediction unit 90 receiving the wireless sensing prediction result requests lifelog data to the lifelog storage unit 80, and the lifelog storage unit 80 searches for lifelog data stored in the device. If there is no Lifelog data in the device, the lifelog utilization unit 60 requests lifelog data from the lifelog storage cloud unit 110, and the lifelog storage unit 120 of the cloud searches for lifelog data stored in the cloud. This is delivered to the lifelog utilization unit 60.

Upon receiving the response to the lifelog data, the lifelog-based prediction unit 90 obtains a prediction result based on the lifelog data, and derives a result by weighting the prediction result based on wireless sensing and the prediction result based on lifelog data.

Figure 14:
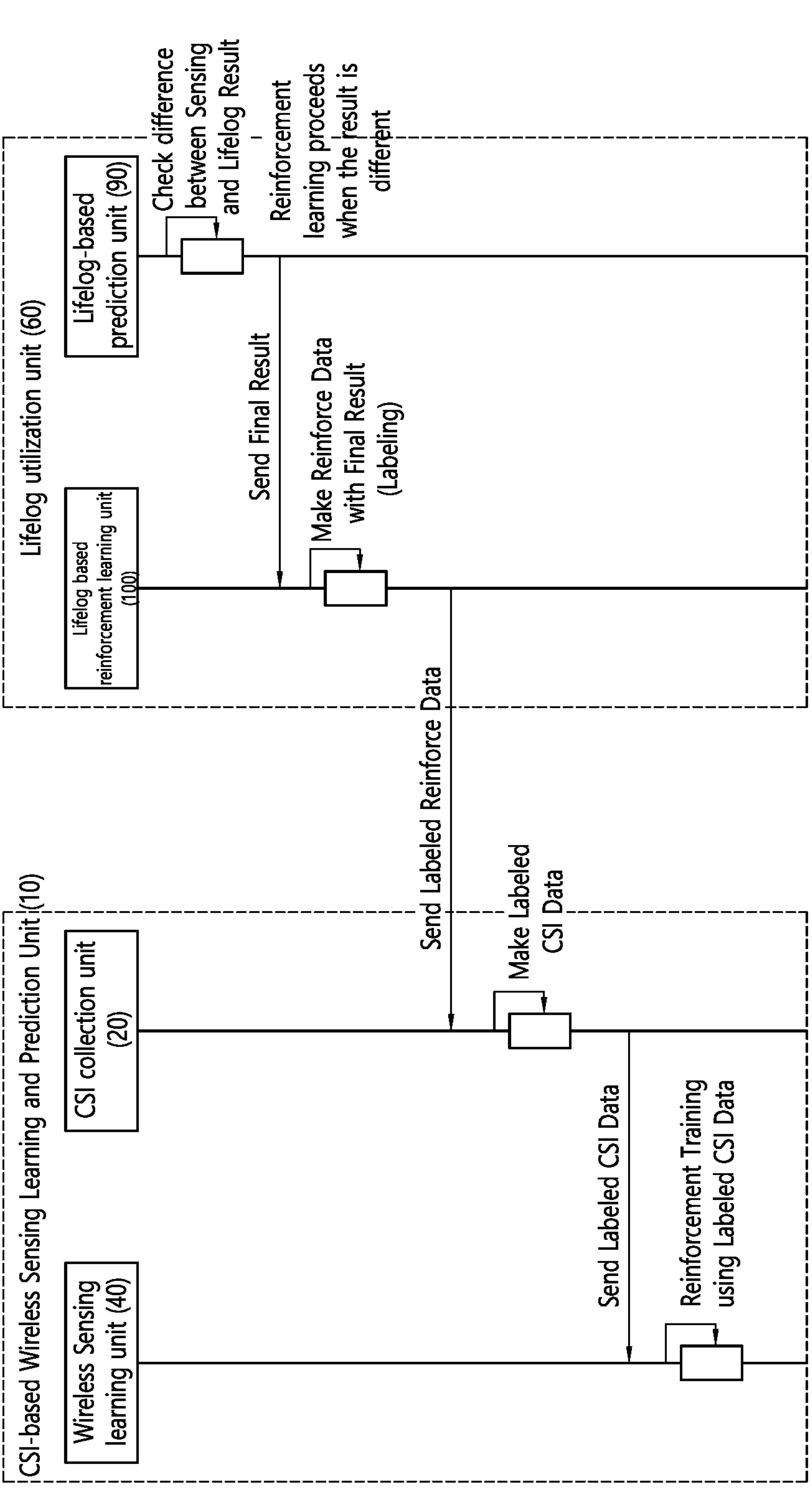
FIG. 14 illustrates a signaling procedure for reinforcement learning based on a lifelog in this embodiment.

FIG. 14 illustrates a signaling procedure for reinforcement learning based on a lifelog in this embodiment.

The lifelog-based prediction unit 90 compares a prediction result based on wireless sensing and a prediction result based on lifelog data, and reinforcement learning is performed only when the result is different. That is, the lifelog-based prediction unit 90 transfers the final result to the lifelog-based reinforcement learning unit 100 and creates reinforcement data by labeling data based on the final result.

The CSI collection unit 20 receives labeled reinforcement data from the lifelog-based reinforcement learning unit 100 and creates labeled CSI data. The CSI collection unit 20 transfers the labeled CSI data to the wireless sensing learning unit 40, and the wireless sensing learning unit 40 performs reinforcement learning using the labeled CSI data.

Hereinafter, an embodiment of enhancing wireless sensing prediction performance by utilizing a lifelog will be described.

Figure 15:
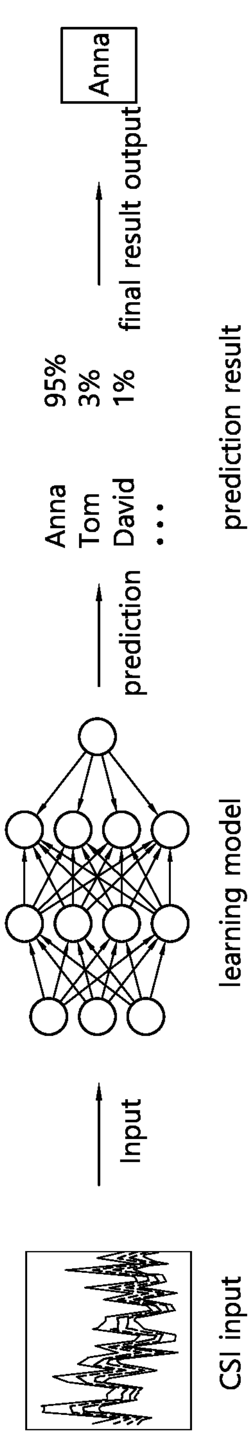
FIG. 15 shows an example of wireless sensing-based prediction when the CSI-based wireless sensing result is clear.

FIG. 15 shows an example of wireless sensing-based prediction when the CSI-based wireless sensing result is clear.

Referring to FIG. 15, even with CSI-based Wireless Sensing learning and prediction, since Anna is 95% and the prediction result is clear, prediction is possible without checking the Lifelog.

Figure 16:
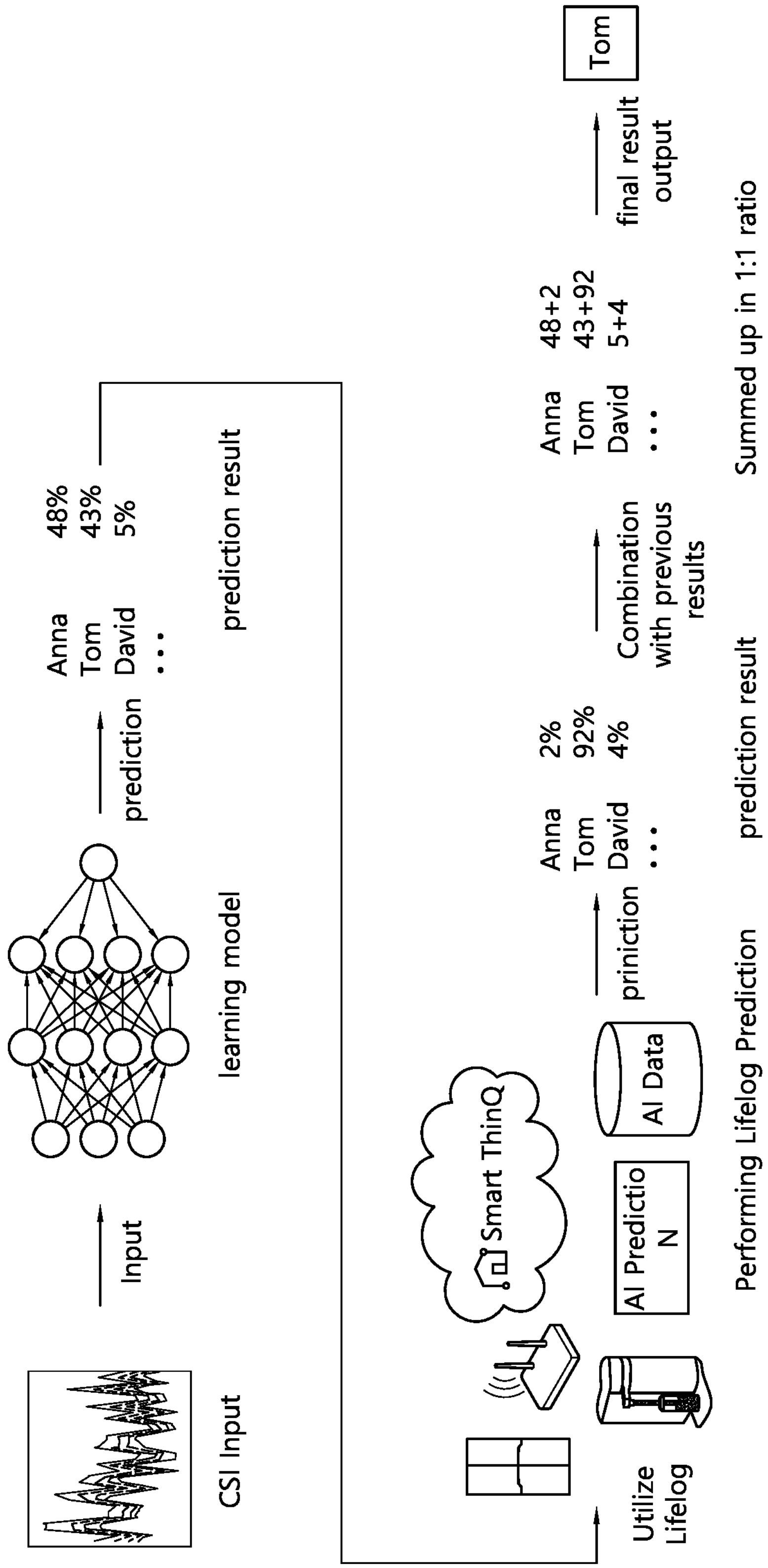
FIG. 16 shows an example of strengthening wireless sensing prediction performance by using lifelog when the CSI-based wireless sensing result is unclear.

FIG. 16 shows an example of strengthening wireless sensing prediction performance by using lifelog when the CSI-based wireless sensing result is unclear.

Referring to FIG. 16, since the result of CSI-based wireless sensing prediction is unclear who Anna is at 48% and Tom at 43%, additional Lifelog-based prediction is required. At this time, the judgment criteria for unclear results can be specified through a certain threshold value.

Referring to FIG. 16, an optimal result is derived by combining a CSI-based prediction result and a Lifelog-based prediction result. At this time, the wireless sensing device can use a method of giving weight and summing each result according to a standard as a combination method that derives an optimal result, and other methods can also be used.

Hereinafter, an embodiment in which reinforcement learning is performed on a learning model through a predicted result using a lifelog will be described.

Figure 17:
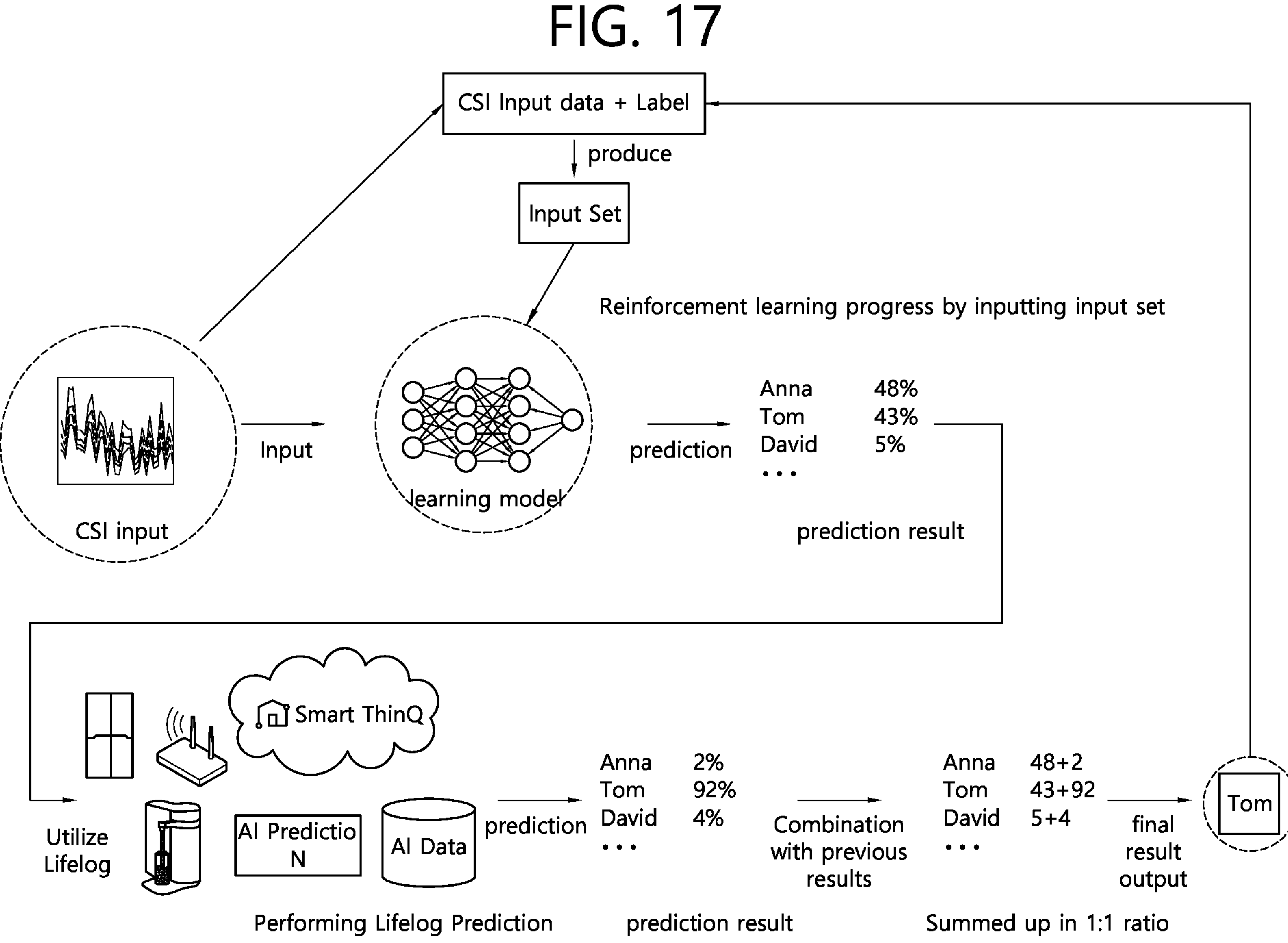
FIG. 17 shows an example of performing reinforcement learning by additionally performing lifelog prediction because the result of CSI-based wireless sensing is unclear.

FIG. 17 shows an example of performing reinforcement learning by additionally performing lifelog prediction because the result of CSI-based wireless sensing is unclear.

Referring to FIG. 17, an input set is created by labeling with the result of "Tom", which is the final result of FIG. 16, and combining CSI input data that was input data of CSI-based wireless sensing. At this time, the Input Set is transferred to the existing learning model, and reinforcement learning of the existing learning model is performed.

If similar type of CSI input data is input in the future, good results can be obtained before additional Lifelog learning.

Hereinafter, an embodiment in which Lifelog is used as input data of a pre-learning model will be described.

Figure 18:
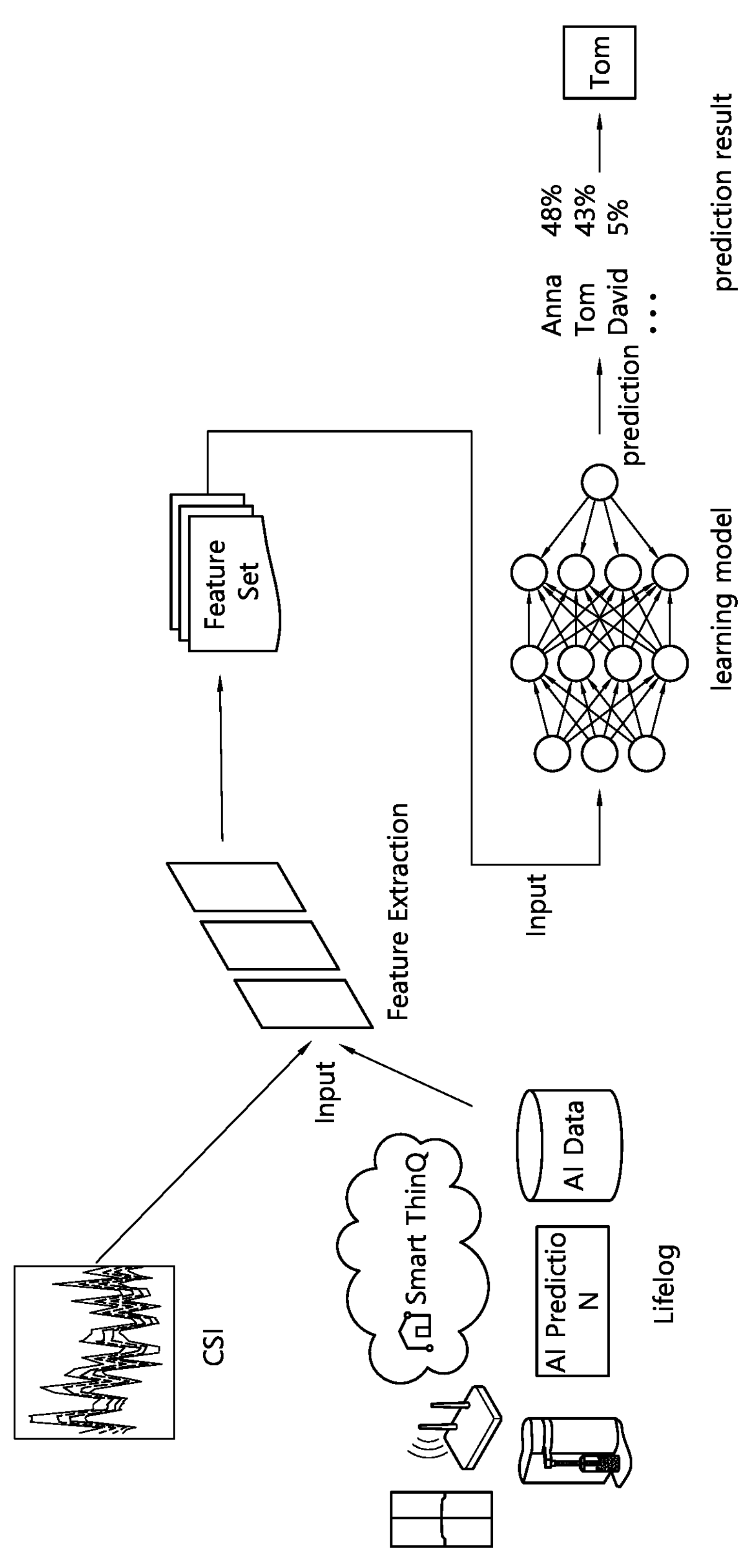
FIG. 18 shows an example in which CSI data and lifelog data are combined as features and used as input data for learning.

FIG. 18 shows an example in which CSI data and lifelog data are combined as features and used as input data for learning.

Referring to FIG. 18, the wireless sensing device performs feature extraction by combining lifelog information corresponding to conditions similar to CSI data (time/day/target device, etc.). The wireless sensing device performs pre-learning using the combined feature set and constructs a pre-learning model. When predicting wireless sensing, the wireless sensing device receives CSI data, acquires and combines lifelog information corresponding to similar conditions (time/day/target device, etc.), and uses it as input data (in FIG. 11, shown). The Wireless Sensing device puts the combined input data into a pre-learning model to obtain a result, and identifies the user through the result.

Hereinafter, the above-described embodiment will be described with reference to FIGS. 1 to 18.

Figure 19:
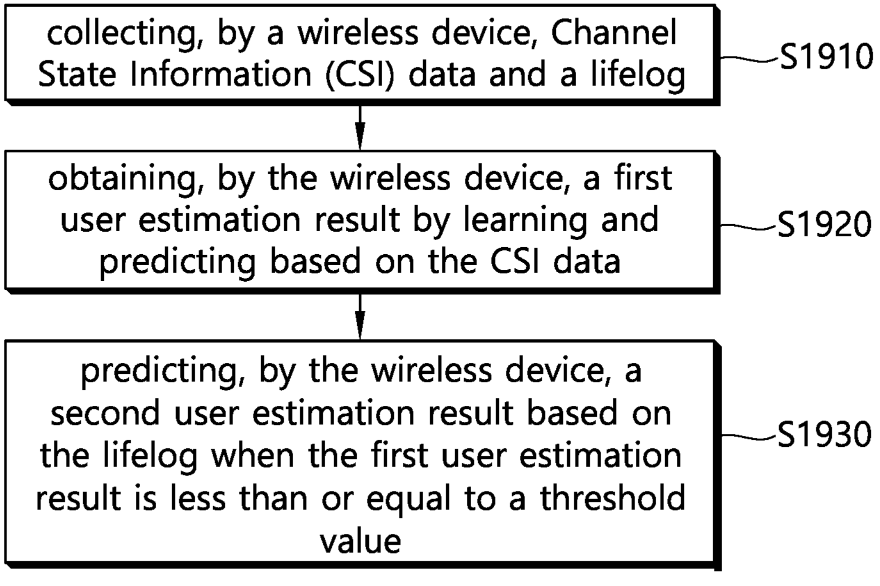
FIG. 19 is a flowchart illustrating a procedure for performing wireless sensing using a lifelog according to an embodiment.

FIG. 19 is a flowchart illustrating a procedure for performing wireless sensing using a lifelog according to an embodiment.

This embodiment proposes a method of increasing the accuracy of a learning model or user identification through a predicted result additionally using a lifelog if a wireless device based on wireless sensing is not capable of identifying a user (or recognizing a user) with only the signal pattern of a wireless signal. Through this embodiment, it is possible to implement a system that can have sufficient accuracy of human recognition and user identification in the user's home environment, so a new paradigm of IoT future smart home devices such as 'artificial intelligence devices that recognize and identify people' can be created.

In step S1910, a wireless device collects Channel State Information (CSI) data and a lifelog. The CSI data may be obtained based on a wireless signal received by the wireless device. The lifelog may be obtained from a fixed device, a cloud, or a mobile device.

The lifelog obtained from the fixed device may include room temperature, device operation, current time or date. The lifelog obtained from the cloud may include current weather, outside temperature, or calendar schedule information. The lifelog obtained from the mobile device may be application usage information or alarm information.

In step S1920, the wireless device obtains a first user estimation result by learning and predicting based on the CSI data.

In step S1930, the wireless device predicts a second user estimation result based on the lifelog when the first user estimation result is less than or equal to a threshold value.

The threshold value is a value obtained by digitizing a probability (or criterion) for determining that the first user estimation result is a specific user. When the threshold value is 80% probability, the probability that the first user estimation result is a specific user is 80% or less, so the result is determined to be unclear and the wireless device may additionally predict the second user estimation result based on the lifelog.

When the first user estimation result exceeds the threshold value, the wireless device may identify the user based on the first user estimation result. In this case, since the probability that the first user estimation result is a specific user is greater than 80%, the wireless device determines that the result is clear and can make a prediction only with the first user estimation result without checking the lifelog.

The wireless device may obtain a final result by putting weights on the first and second user estimation results. The wireless device may obtain a final result in a method of giving weight to a part having higher reliability among the first and second user estimation results and summing them (for example, giving a weight of 1:2 and summing them).

The wireless device may obtain a third user estimation result by learning and predicting based on the CSI data in which the final result is labeled. Reinforcement learning refers to providing CSI data labeled with the final result as input data and using it in an existing pre-learning model. CSI data labeled with the final result may also be referred to as reinforcement learning data. That is, the wireless device can enhance prediction performance based on wireless sensing by utilizing the lifelog, and can identify a user based on a reinforcement learning result (the third user estimation result).

As another example, the wireless device may obtain a feature set by combining the CSI data and the lifelog. The wireless device may obtain a fourth user estimation result by learning and predicting based on the feature set. In the above embodiment, the wireless device may obtain a result by setting feature extraction data by combining the CSI data and the lifelog as input data of a pre-learning model, and identify a user based on the result (fourth user estimation result).

The lifelog may be stored in the wireless device or in the cloud. The lifelog is stored in the wireless device when self-storage is possible in the wireless device, but when self-storage is not possible in the wireless device, the lifelog is stored in the cloud so that the stored data can be retrieved when the wireless device learns. The cloud also means Artificial Intelligence (AI) Cloud. The second user estimation result may be predicted based on the stored lifelog.

In this embodiment, the result learned and predicted may be obtained based on machine learning or deep learning as a pre-learning model.

3. Device Configuration

Figure 20:
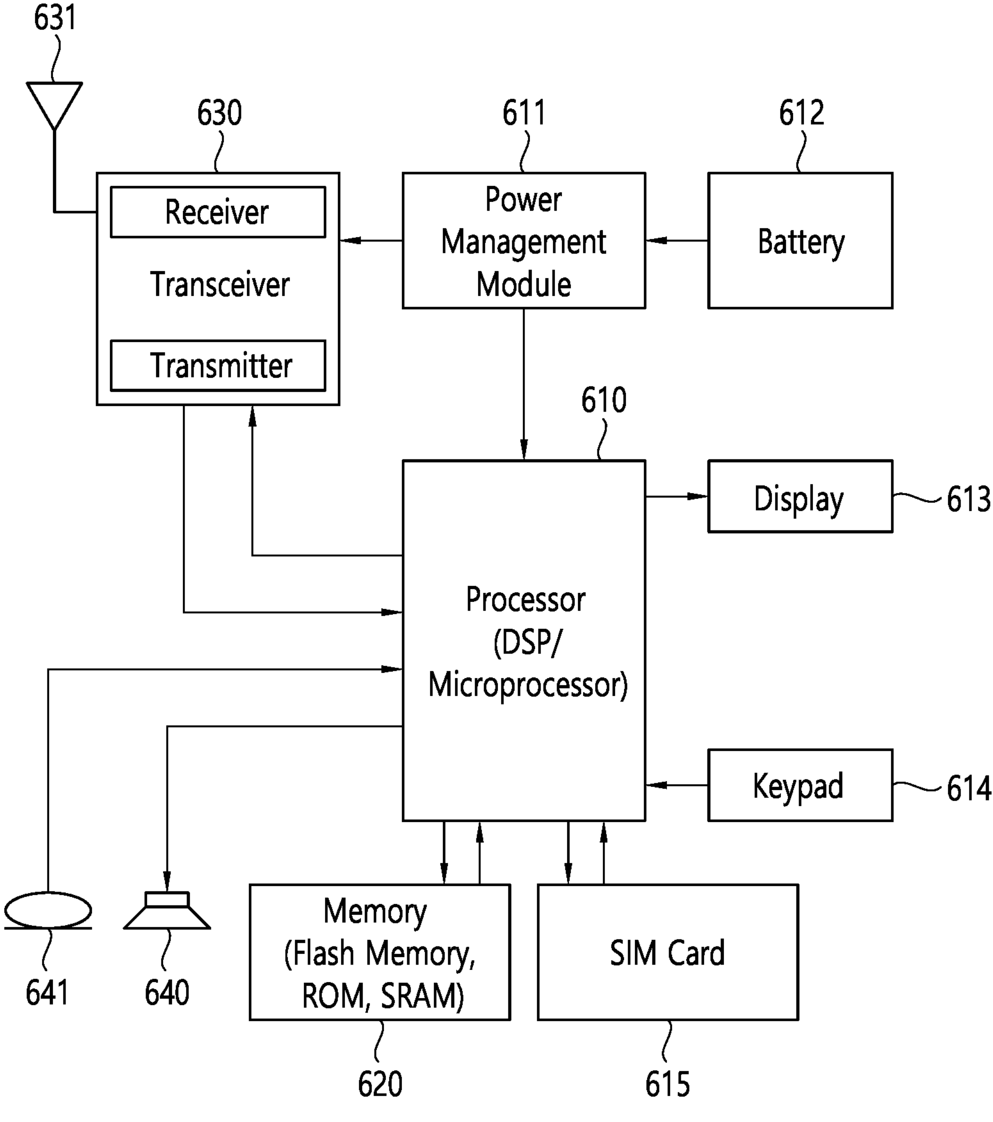
FIG. 20 illustrates modified examples of a transmitting device and/or receiving device of the present specification.

FIG. 20 illustrates modified examples of a transmitting device and/or receiving device of the present specification.

Each device/STA shown in sub-figures (a)/(b) of FIG. 1 may be modified as shown in FIG. 18. A transceiver 630 of FIG. 20 may be the same as the transceiver(s) 113 and 123 of FIG. 1. The transceiver 630 of FIG. 20 may include a receiver and a transmitter.

A processor 610 of FIG. 20 may be the same as the processor(s) 111 and 121 shown in FIG. 1. Alternatively, the processor 610 of FIG. 20 may be the same as the processing chip(s) 114 and 124 shown in FIG. 1.

A memory 150 of FIG. 20 may be the same as the memory(s) 112 and 122 shown in FIG. 1. Alternatively, the memory 150 of FIG. 20 may be a separate external memory that is different from the memory(s) 112 and 122 shown in FIG. 1.

Referring to FIG. 20, the power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices (such as mobile phones and computers).

Referring to FIG. 20, the speaker 640 may output sound-related results processed by the processor 610. The microphone 641 may receive sound-related inputs to be used by the processor 610.

The above-described technical features of the present specification may be applied to various device and methods. For example, the above-described technical features of the present specification may be performed/supported through FIG. 1 and/or FIG. 20. For example, the above-described technical features of the present specification may be applied to only part of FIG. 1 and/or FIG. 20. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 20. For example, an apparatus herein is an apparatus for generating a user identification model based on wireless sensing, the apparatus comprising a memory and a processor operatively coupled to the memory, the processor is configured to collect Channel State Information (CSI) data and a lifelog; obtain a first user estimation result by learning and predicting based on the CSI data; and predict a second user estimation result based on the lifelog when the first user estimation result is less than or equal to a threshold value.

The technical features of the present specification may be implemented based on a computer readable medium (CRM). For example, the CRM that is proposed in the present specification is a computer readable medium including an instruction being executed by at least one processor.

The CRM may store instructions performing operations including the steps of collecting Channel State Information (CSI) data and a lifelog; obtaining a first user estimation result by learning and predicting based on the CSI data; and predicting a second user estimation result based on the lifelog when the first user estimation result is less than or equal to a threshold value. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 20. Meanwhile, the CRM of the present specification may be the memory(s) 112 and 122 of FIG. 1, or the memory 620 of FIG. 20, or a separate external memory/storage medium/disc, and so on.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless LAN system based on wireless sensing, the method comprising:

collecting, by a wireless device, Channel State Information (CSI) data and a lifelog;

obtaining, by the wireless device, a first user estimation result by learning and predicting based on the CSI data;

predicting, by the wireless device, a second user estimation result based on the lifelog when the first user estimation result is less than or equal to a threshold value;

obtaining, by the wireless device, a final result by putting weights on the first and second user estimation results;

obtaining, by the wireless device, a third user estimation result by learning and predicting based on the CSI data in which the final result is labeled; and identifying, by the wireless device, a user based on the third user estimation result.

2. The method of claim 1, further comprising:

obtaining, by the wireless device, a feature set by combining the CSI data and the lifelog; and obtaining, by the wireless device, a fourth user estimation result by learning and predicting based on the feature set.

3. The method of claim 1, wherein the CSI data is obtained based on a wireless signal received by the wireless device, wherein the lifelog is obtained from a fixed device, a cloud, or a mobile device, wherein the lifelog obtained from the fixed device is room temperature, device operation, current time or date, wherein the lifelog obtained from the cloud is current weather, outside temperature or calendar schedule information, wherein the lifelog obtained from the mobile device is application usage information or alarm information.

4. The method of claim 3, wherein the lifelog is stored in the wireless device or in the cloud, wherein the second user estimation result is predicted based on the stored lifelog.

5. The method of claim 1, further comprising:

identifying, by the wireless device, a user based on the first user estimation result when the first user estimation result exceeds the threshold value.

6. A wireless device in a wireless LAN system based on wireless sensing, the wireless device comprising:

a memory;

a transceiver; and a processor being operatively connected to the memory and the transceiver, wherein the processor is configured to:

collect Channel State Information (CSI) data and a lifelog;

obtain a first user estimation result by learning and predicting based on the CSI data;

predict a second user estimation result based on the lifelog when the first user estimation result is less than or equal to a threshold value;

obtain a final result by putting weights on the first and second user estimation results; and obtain a third user estimation result by learning and predicting based on the CSI data in which the final result is labeled.

7. The wireless device of claim 6, wherein the processor is further configured to:

obtain a feature set by combining the CSI data and the lifelog; and obtain a fourth user estimation result by learning and predicting based on the feature set.

8. The wireless device of claim 6, wherein the CSI data is obtained based on a wireless signal received by the wireless device, wherein the lifelog is obtained from a fixed device, a cloud, or a mobile device, wherein the lifelog obtained from the fixed device is room temperature, device operation, current time or date, wherein the lifelog obtained from the cloud is current weather, outside temperature or calendar schedule information, wherein the lifelog obtained from the mobile device is application usage information or alarm information.

9. The wireless device of claim 8, wherein the lifelog is stored in the wireless device or in the cloud, wherein the second user estimation result is predicted based on the stored lifelog.

10. The wireless device of claim 6, wherein the processor is further configured to:

identify a user based on the first user estimation result when the first user estimation result exceeds the threshold value.

* * * * *